United States Patent [19]

Fenart

[11]  4,222,475

[45]  Sep. 16, 1980

[54] TORSION DAMPING DEVICE, PARTICULARLY FOR A MOTOR VEHICLE CLUTCH

[75] Inventor: Jean Claude Fénart, Fourqueux, France

[73] Assignee: Societe Anonyme Francaise du Ferodo, Paris, France

[21] Appl. No.: 849,882

[22] Filed: Nov. 9, 1977

[30] Foreign Application Priority Data

Nov. 15, 1976 [FR] France ............................ 76 34242

[51] Int. Cl.² ............................................. F16D 3/14
[52] U.S. Cl. ............................................... 192/106.2
[58] Field of Search ............... 192/106.2, 106.1, 70.17; 64/27 C, 27 F

[56] References Cited

U.S. PATENT DOCUMENTS

| | | | |
|---|---|---|---|
| 2,276,416 | 3/1942 | Nutt | 192/106.2 |
| 3,327,820 | 6/1967 | Maurice | 192/106.2 |
| 3,428,155 | 2/1969 | Binder et al. | 192/106.1 |
| 3,695,405 | 10/1972 | Maucher et al. | 192/106.2 |
| 3,948,373 | 4/1976 | Wörner | 192/106.2 |
| 4,101,015 | 7/1978 | Radke | 64/27 F |

FOREIGN PATENT DOCUMENTS

1235699  6/1971  United Kingdom ................ 192/106.2
1428557  3/1976  United Kingdom ................ 192/106.2

Primary Examiner—Kenneth Downey
Attorney, Agent, or Firm—Charles E. Brown

[57] ABSTRACT

The invention relates to a torsion damping device, particularly for a motor vehicle clutch, of the kind which comprises two coaxial parts mounted for rotation relative to one another within the limits of a predetermined relative angular movement sector, two guide washers extending parallel to the said disc on each side of the disc and connected to one another by small posts, elastic means interposed circumferentially between the said parts, and friction means interposed axially between the parts, the said friction means comprising at least one friction washer which is subjected to the action of elastic clamping means having an axial action and which, when in contact with one of the said parts, is adapted to be fastened to the other of the said parts for at least part of the said sector of angular movement, and the elastic clamping means having an axial action thus associated with the said friction washer bearing against a transverse shoulder turned towards one of the said guide washers and urging the friction washer in the direction of the same guide washer. The invention consists in that the said transverse shoulder is associated with the said small posts.

10 Claims, 17 Drawing Figures

TORSION DAMPING DEVICE, PARTICULARLY FOR A MOTOR VEHICLE CLUTCH

BACKGROUND OF THE INVENTION

1. Field of the Invention

This invention relates to torsion damping devices, particularly for motor vehicle clutches, of the kind comprising two coaxial parts mounted for rotation relative to one another within the limits of a determined relative angular movement sector, and elastic means circumferentially interposed between the said parts.

2. Description of the Prior Art

Torsion damping devices of said kind make it possible to achieve regulated transmission from one of their coaxial component parts to the other of any torque which may be applied to one of the parts in question, that is to say to filter the vibrations, particularly sound vibrations, which may otherwise occur along the entire kinematic chain in which they are installed.

They are in particular used in certain clutches, particularly for automobile vehicles, in the form of a clutch friction unit usually known as a damping hub clutch friction unit, one of their parts then carrying a friction disc adapted to be gripped between two elements rotationally fixed to a first shaft, for example a drive shaft, while the other part is rotationally fixed on a second shaft, for example a driven shaft.

It is known for friction means adapted to introduce a "hysteresis" effect into the operating characteristics of a torsion damping device of this kind to be inserted between the two coaxial component parts of the device; for the same angle of movement between the said parts this hysteresis effect results in a difference between the value of the torque transmitted between these parts when the said movement takes place in a first direction, usually known as the direct direction, and the value of this torque transmitted when this movement takes place in the opposite direction, generally called the reverse direction.

It is in fact found that for certain applications a hysteresis effect of this kind contributes towards limiting vibrations and noise emitted by all the rotating elements associated with the kinematic chain to which the driving and driven shafts in question belong.

It is also known for the elastic means circumferentially interposed between the coaxial component parts of a torsion damping device of this kind to be divided into a number of separate groups, usually known as stages, for the purpose of spaced intervention of these groups all along the sector of relative angular displacement between the said parts, and for specific friction means to be associated with one or more of these groups or stages.

This arrangement enables not only the value of troque transmissible between these parts but also the hysteresis effect associated therewith to be modulated along the sector of angular movement of the coaxial parts in question, this hysteresis effect depending particularly on the magnitude of the action of the friction means used, and therefore in practice on the number of friction washers actually used for a determined angle of movement between the said parts.

This hysteresis effect nevertheless also depends on the elastic load to which these friction means are subjected.

In hitherto known torsion damping devices of the kind in question this load is most usually developed by elastic clamping means which have an axial action and which, since they bear against one of the component coaxial parts of a device of this kind, act in the direction of the other of these parts.

Since the two parts in question are not only angularly movable in relation to one another, but also axially movable in relation to one another, this has the effect that these elastic clamping means having an axial action are applied indiscriminately to all the friction means, in practice friction washers, inserted axially between the said parts.

In this case it is thus not possible to make use of these elastic means having an axial action to modulate accordingly the hysteresis effect due to the corresponding friction means.

It is true that it has already been proposed that the elastic clamping means having an axial action which are associated with any friction washer should bear against that one of the component coaxial parts of the corresponding torsion damping device which is the part with which the said friction washer is in contact, this arrangement making it possible for a particular elastic load to be associated with the friction washer in question when the latter intervenes, this particular elastic load coming into action only for this intervention.

The arrangements thus already proposed are however relatively complex in use.

It has already been proposed that the elastic clamping means having an axial action which are associated with a friction washer should bear against a transverse shoulder turned towards one of the guide washers and that they should urge the said friction washer in the direction of this same guide washer, this arrangement also making it possible for only a particular elastic load to be associated with the friction washer in question.

However, apart from the fact that in the corresponding arrangement this friction washer is not interposed axially between the two respective parts of the torsion damping device in question, and in particular is situated outside the space contained between the guide washers of the said device, which cannot fail to increase its axial dimensions, the transverse shoulder against which bear the elastic clamping means acting on the said friction washer is formed on parts specifically attached for the purpose to one of the guide washers, which also cannot fail to increase the cost of the entire device.

SUMMARY

The present invention relates generally to an arrangement which enables these disadvantages to be overcome and which is relatively easy and economical to apply.

More precisely, it relates to a torsion damping device, particularly for a motor vehicle clutch, of the kind comprising two coaxial parts which are mounted for rotation relative to one another within the limits of a determined relative angular movement sector, and which comprise a disc and two guide washers extending parallel to the said disc on each side of the latter and connected to one another by small posts, elastic means interposed circumferentially between the said parts, and friction means interposed axially between the parts, the said friction means comprising at least one friction washer which is subjected to the action of elastic clamping means having an axial action and which, when in contact with one of the said parts, is adapted to be fastened to the other of the said parts for at least part of the said sector of angular movement, and the elastic clamping means having an axial action thus associated with the said friction washer bearing against a transverse shoulder turned towards one of the aforesaid guide washers and urging the said friction washer in the direction of the same guide washer, a torsion damping device of this kind being characterised in that the said transverse shoulder is associated with the said small posts.

The friction washer is thus in a way gripped between a guide washer and elastic means which bear against a shoulder axially fastened to the said guide washer and which apply their action only to this single friction washer.

In a particular embodiment of the invention, in the case of a clutch friction unit, that is to say a torsion damping device in which one of the rotatable coaxial parts of which it is composed is fastened to a hub while the other carries a friction disc, it is the friction disc which by its central zone forms by itself the elastic clamping means having an axial action which are associated with one of the friction washers used, the said friction washer being disposed between one of the guide washers and the said central portion of the friction disc.

However, as an alternative, the elastic clamping means having an axial action may be composed of elastic strips, optionally joined together by a common washer.

However this may be, the shoulder of the small posts connecting the two guide washers, against which shoulder the elastic clamping means having an axial action bear, is preferably that shoulder which secures the said posts to one of the guide washers, for example by riveting, so that one and the same connection means thus conjointly joins the said guide washer and the elastic means to the said small posts.

This arrangement, which is particularly economical to apply, advantageously leads to the formation, if desired, of a sub-assembly unit capable of being assembled separately and of then being used to participate in the construction of the desired torsion damping device, whereby at least in certain cases this construction is facilitated.

DESCRIPTION OF PREFERRED EMBODIMENTS

Figure 1:
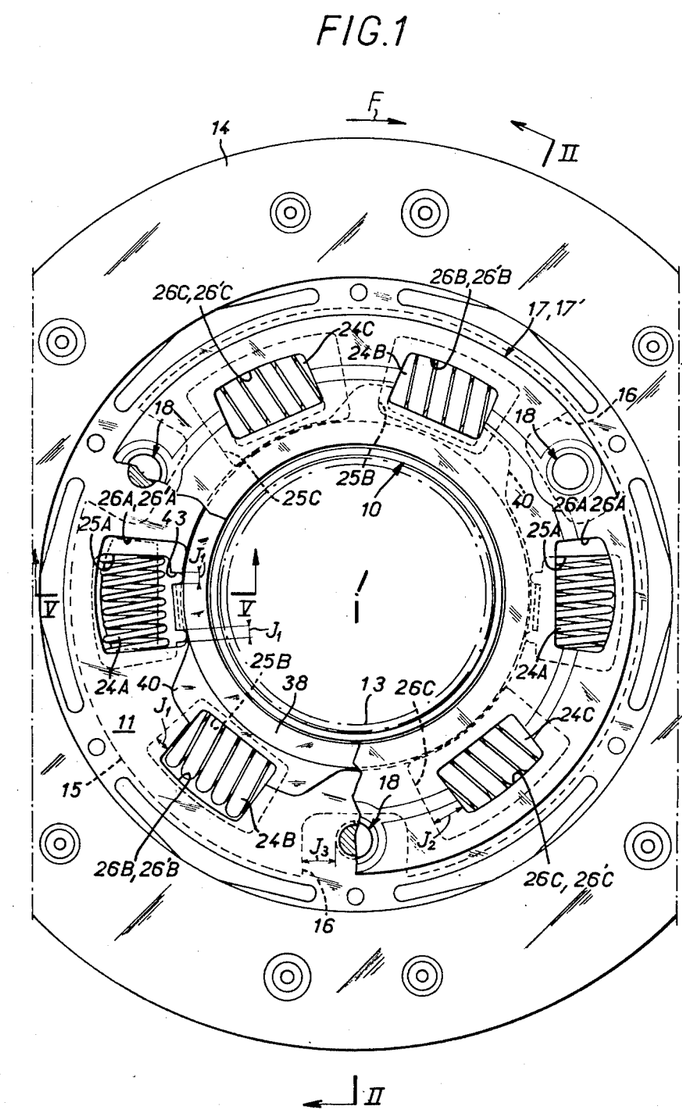
FIG. 1 is a partial view in elevation of a clutch friction unit comprising a torsion damping device according to the invention, viewed in the direction of the arrow I in FIG. 2 and partly broken away.
Figure 2:
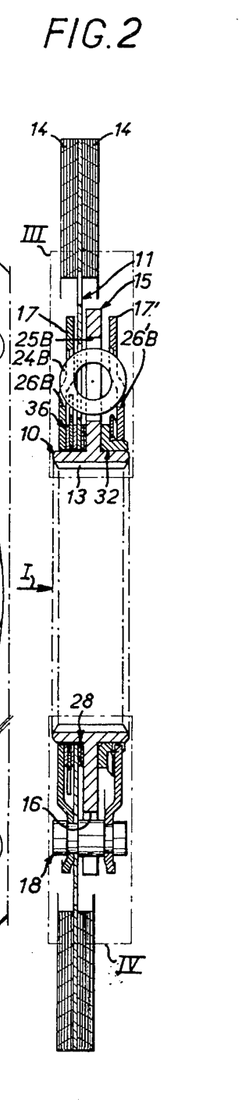
FIG. 2 is a view in axial section of the clutch friction unit taken on the broken line II—II in FIG. 1.
Figure 3:
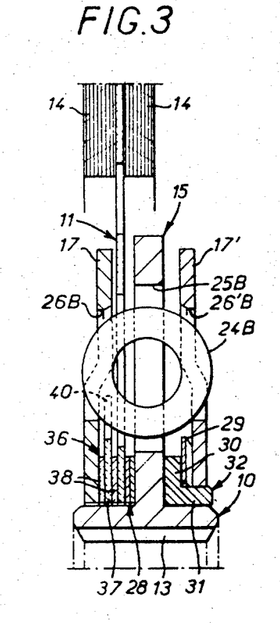
FIGS. 3 and 4 show respectively to an enlarged scale details of FIG. 2 which are indicated by the boxes III and IV in FIG. 2.

Referring to the drawings, FIGS. 1 and 2 illustrate a damping hub clutch friction unit.

As is known, a clutch friction unit of this kind constitutes a torsion damping device comprising two coaxial parts mounted for rotation relative to one another within the limits of a determined relative angular movement sector, against the action of elastic return means, one of these parts being fastened to a hub 10 while the other carries a friction disc 11.

In a manner known per se the hub 10 is provided on its inner periphery with grooves 13 adapted to permit rotational coupling to a first shaft, which in practice is a driven shaft, and on its periphery the friction disc 11 carries on each of its faces friction linings 14 adapted to enable it to be gripped between two plates and thus to be rotationally coupled to a second shaft, which in practice is a driving shaft.

In the example illustrated the first of these parts of a torsion damping device of this kind is composed of a hub disc 15 radially projecting from the middle zone of the hub 10 and fastened to the latter, either being made in one piece with the said hub or being attached thereto in a suitable manner.

Conjointly, the second of the said parts comprises, in this case, two guide washers 17, 17' which extend parallel to the hub disc 15 on each side of the latter, and which are connected together by small posts 18 passing with clearance through cutouts 16 provided for the purpose on the periphery of the said hub disc 15.

Figure 4:
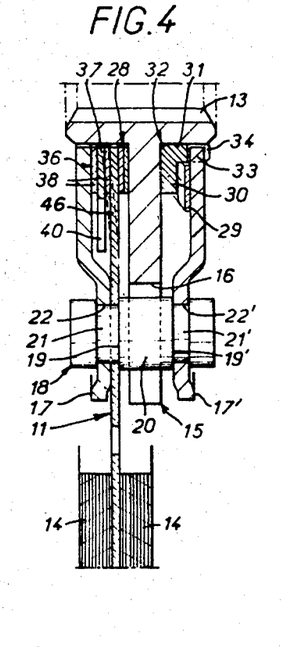
Figure 5:
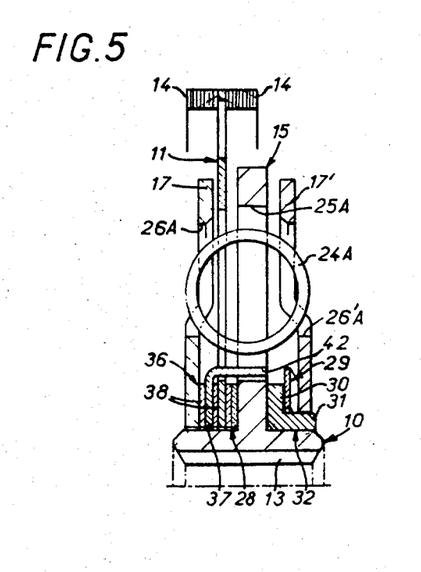
FIG. 5 shows to the same scale as FIGS. 3 and 4 a view in partial section on the line V—V in FIG. 1.

In the example illustrated, particularly in FIG. 4, the small posts 18 and the guide washers 17, 17' are secured by riveting; each small post 18 comprises a central stem 20 and, beyond transverse shoulders 19, 19' which are turned towards the corresponding guide washers 17, 17', portions 21, 21' of reduced diameter which pass through openings 22, 22' which are provided for the purpose in the said guide washers 17, 17' and which beyond the said washers are riveted.

In the example illustrated the connection means of the posts 18 and guide washers 17, 17' also serves for rotationally fastening the friction disc 11 to the guide washers 17, 17'.

For this purpose one of the portions 21 of reduced diameter of the posts 18 passes through the friction disc 11, the latter thus being held between the transverse shoulder 19 of the posts 18 and the guide washer 17.

In a manner known per se elastic means are interposed circumferentially between on the hub disc 15 and the guide washers 17, 17'.

In the example illustrated these elastic means are composed of three separate groups or stages 24A, 24B, 24C of springs, FIG. 1, disposed tangentially in sockets formed partly by windows 25A, 25B, 25C provided for this purpose in the hub disc 15 and partly by windows 26A, 26B, 26C and 26'A, 26'B, 26'C likewise provided for the purpose in the guide washers 17 and 17' respectively.

In the example illustrated the two springs 24A are mounted in opposition to one another and when the clutch friction unit is in the position of rest they are in contact by their ends with the hub disc 15 in respect of one of these ends and, in respect of the other of these ends, in contact with guide washers 17, 17'.

On the contrary, when the friction unit is in the position of rest the springs 24B and 24C are in contact by their ends only with the guide washers 17, 17', the corresponding windows 25B, 25C of the hub disc 15 having a circumferential development greater than that of the corresponding windows 26B, 26C and 26'B, 26'C of the guide washers 17, 17' and projecting circumferentially on each side of the said windows 26B, 26C and 26'B, 26'C to the extent of a clearance J1 in the case of the springs 24B and to the extent of a clearance J2, greater than the clearance J1, in the case of the springs 24C.

The clearance J3 on each side of the posts 18 as they pass through the cutouts 16 in the hub disc 15 is greater than the abovementioned clearance J2.

When the friction disc 11 is driven in the direction of the arrow F in FIG. 1, the hub disc 15 is first urged to rotate only by means of a single spring 24A, which is compressed, the other springs 24A being conjointly relaxed until for the direction of rotation in question the circumferential clearance J1 existing between the windows 25B on the one hand and 26B, 26'B on the other hand, serving to receive the springs 24B, is absorbed.

After this circumferential clearance J1 has been absorbed, the effects of the springs 24B are added to those of the springs 24A.

Similarly, after absorption of the circumferential clearance J2 existing between on the one hand the windows 25C and on the other hand the windows 26C, 26'C serving to receive the springs 24C, the effects of these latter are added to those of the springs 24A and 24B already in action, within the limits of the movement sector provided between the two coaxial rotary parts constituting the torsion damping device, namely on the one hand the part formed by the hub disc 15 and on the other hand the part formed by the guide washers 17, 17', these limits resulting from the complete circumferential crushing of the springs 24A and/or of the springs 24B and/or of the springs 24C, or of positive rotational driving of the hub disc 15 by the spacers 18 through the abutment of the latter after absorption of the clearance J3 which they initially have in passing through the cutouts 16 of this hub disc 15.

These arrangements are well known per se and they will not be described here in greater detail.

Likewise in a manner well known per se, friction means are in addition provided between the two coaxial rotary parts constituting the torsion damping device in question, in order to introduce a hysteresis effect into the operating characteristics of the said device, as previously explained.

In the example of embodiment illustrated the friction means comprise a friction washer 28 inserted between on the friction disc 11, which is rotationally fastened to the guide washers 17, 17', and the hub disc 15 which is rotationally fastened to the hub 10; in the example illustrated the friction washer 28 is composed of a stack of two elementary friction washers, combining their effects.

Elastic clamping means having an axial action are associated with the friction washer 28, these clamping means consisting in the example illustrated of a corrugated washer 29 of the "ONDUFLEX" type, which is inserted between the guide washer 17' and a spacer washer 30 disposed in contact with the hub disc 15.

In the example of embodiment illustrated the spacer washer 30 is integral with a sleeve 31 forming a bearing which is inserted radially between the hub 10 and the guide washer 17'; in a manner known per se the part 32 thus constituted by the spacer washer 30 and the sleeve 31 is of a material having a low coefficient of friction in order to minimise any parasitic friction capable of occurring between the guide washer 17' and the hub 10, and it is rotationally fixed on the side guide washer 17', the latter having for example, as illustrated, teeth 33 on its inner periphery for engagement in cutouts 34 in the sleeve 31.

However this may be, the elastic washer 29 permanently urges the friction washer 28 to be clamped between the assembly formed by the friction disc 11 and the guide washer 17 to which the latter is fastened and the hub disc 15, bearing against the hub disc 15 by way of the spacer washer 30 and pushing the said assembly towards the hub washer through the medium of the guide washer 17' on which it acts and of the posts 18 connecting the said guide washer to the aforesaid assembly.

The effects of hysteresis induced by this friction washer 28 are therefore repeated all along the sector of angular movement between the two component parts of the torsion damping device 12.

The three groups 24A, 24B, 24C of springs thus constitute three separate damping stages within the friction unit, and these damping stages successively add their effects to one another.

In a manner known per se provision is made for associating additional friction means with at least one of the damping stages.

In the example illustrated in FIGS. 1 to 5, the additional friction means comprise a friction washer 36 which is composed of a support plate 37 carrying friction linings 38 on each of its faces, and which is inserted axially between the guide washer 17 and the friction disc 11, and therefore inside the space formed between the two guide washers 17, 17'.

Between the posts 18 and the hub 10 the guide washer 17 has a deformation providing a free space between it and the friction disc to permit the insertion of the friction washer 36 after the style of the guide washer 17, which has a similar deformation contributing towards forming the space necessary for the insertion between it and the hub disc 15 of the corrugated washer 29 and spacer washer 30.

The support plate 37 of the friction washer 36 has on its outer periphery two radial lugs 40 cut out to form two branches by which it is engaged radially on the springs 24B.

In substantially diametrically opposite positions it also has two axial lugs 42 which pass through the windows 26A of the guide washer 17 for engagement in cutouts 43 of the hub disc 15 which in the example illustrated lead into the windows 25A of the latter.

In the position of rest of the friction unit, in the example shown in FIGS. 1 to 6 a circumferential clearance J1 is left on each side of the lugs 42 in relation to the cutouts 43 in which they are engaged, and this circumferential clearance is equal to the circumferential clearance J1 associated with the springs 24B as previously described.

Specific elastic clamping means having an axial action are associated with the friction washer 36.

According to the invention these clamping means bear against a transverse shoulder on the posts 18 which is turned towards the guide washer 17, and they urge the friction washer 36 in the direction of the guide washer.

In the embodiment of the invention which is illustrated in FIGS. 1 to 6 it is the friction disc 11 which by its central zone 46 itself forms the elastic clamping means, having an axial action, which is thus associated specifically with the friction washer 36.

To this end the central portion 46 of the friction disc 11 has through its constitution an elastic deformation shown diagrammatically in dashed lines in FIG. 4, which gives it a conformation similar to that of a Belleville washer, with the result that when the friction disc is joined to the guide washer 17 after insertion of the friction washer 36 the latter is prestressed; as an alternative the central portion 46 of the friction disc 11 may be divided into elastic strips, or its conformation similar to a Belleville washer may be given to it only after the riveting of the posts 18.

As will be clear, the elastic clamping means having an axial action which are thus formed do not in any way intervene in the clamping of the previously described friction washer 28.

When only the springs 24A intervene, as described above, the friction washer 36 is inoperative, the friction washer being rotationally fastened on the springs 24B and therefore following them as they are driven by the guide washer 17, 17', so that no relative movement occurs between it and the assembly consisting of the guide washer 17 and the friction disc 11.

On the other hand, when for the direction of rotation indicated by the arrow F in FIG. 1, usually called the direct direction, the circumferential clearance J1 is absorbed, and when consequently on the one hand the springs 24B are in contact with the corresponding edge of the windows 25A in the hub disc 15 in which they are engaged, and when on the other hand the axial lugs 42 of the support plate 37 of the friction washer 36 are conjointly in contact with the corresponding edge of the cutouts 43 of the hub disc 15 in which they are themselves engaged, the friction washer 36 is rotationally connected to the hub disc 15, while the guide washers 17, 17' continue their rotation in relation to the hub disc 15, so that the friction washer 36 then performs a movement of rotation in relation to the guide washer 17 and to the friction disc 11 between which it is inserted, and then adds its effect to that of the friction washer 38.

When the friction washer returns to the position of rest, in the opposite direction of rotation of the friction disc 11 to that indicated by the arrow F in FIG. 1, that is to say in the direction commonly called the reverse direction, the springs 24B return the friction washer 36 to its original position by acting on the corresponding branches of the radial lugs 40 of the latter.

As will be readily understood, the elastic load applied to the friction washer 36 by the elastic clamping means having an axial action which are associated with it can be separately adjusted.

As will likewise be readily understood, the guide washer 17 together with the posts 18, the friction disc 11, and the friction washer 36 may constitute a subassembly unit capable of being assembled separately, optionally on a removable dummy mandrel, and be subsequently used for forming the friction unit.

Figure 6:
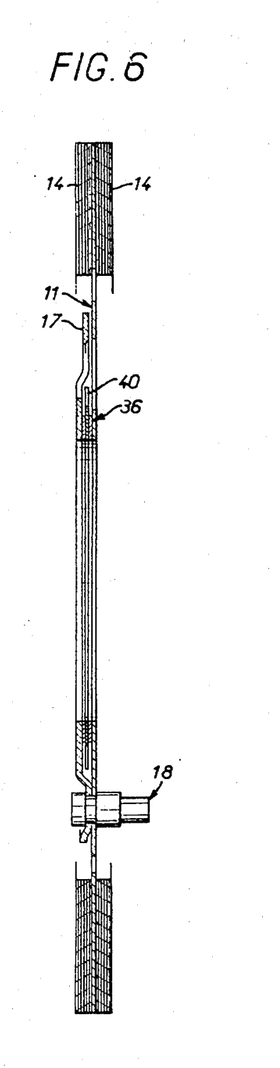
FIG. 6 is a similar view to that shown in FIG. 2 for a sub-assembly unit capable of participating according to the invention in the construction of the clutch friction unit.

A sub-assembly unit of this kind is shown in FIG. 6.

In this sub-assembly unit, which can be manipulated separately and in one piece, when applicable with the removable dummy mandrel on which it was assembled, the elastic clamping means having an axial action constituted by the central portion 46 of the friction disc 11 bear against the shoulder 19 of the supporting posts 20, which shoulder is turned towards the guide washer 17, and in practice are joined to the said guide washer 17 together with the said posts at one end of the latter, the other end of these posts remaining free for subsequent riveting on the guide washer 17'.

In the modified embodiment illustrated in FIGS. 7 to 10 the friction washer 28 is disposed on the same side of the hub disc 15 as the guide washer 17' and is connected to the latter by lugs 44; the spacer washer 30 and the sleeve 31 integral with it are disposed on the same side of the hub disc 15 as the guide washer 17; the friction washer 36 associated with the guide washer 17 is disposed between the central portion 46 of the friction disc 11 and the spacer washer 30.

Conjointly, the elastic clamping means having an axial action which are associated with the friction washer 36 act on the latter by way of the spacer washer 30 and bear against a shoulder 47 provided for the purpose on the face of the spacer washer 30 which is turned towards the hub disc 15 (FIG. 9), set back in relation to the said face.

In the embodiment illustrated in FIGS. 7 to 10 the elastic clamping means having an axial action comprise a plurality of separate elastic strips 48 which extend generally radially from respective posts 18.

In practice, one elastic strip 48 is thus associated with each post 18 and, as previously, the said elastic strip 48 bears against the shoulder 19 of a post which is directed towards the guide washer 17.

As previously, the load applied by the elastic strips 48 to the friction washer 36 can be adjusted independently, and these elastic strips have no effect on the load to which the friction washer 28 is otherwise subjected.

Figures 10, 11:
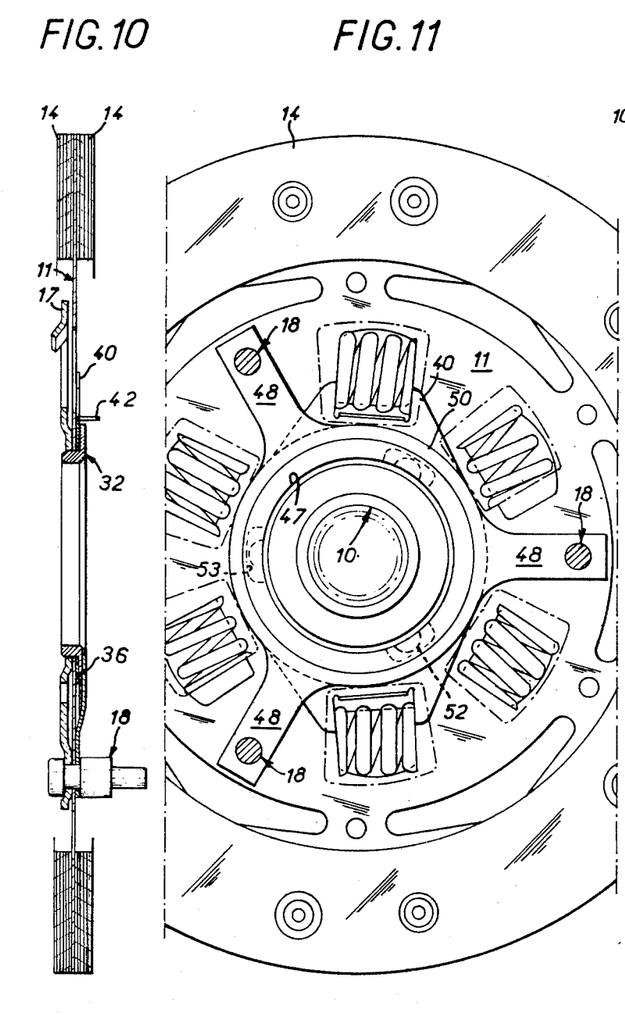
FIG. 11 is a partial view similar to that in FIG. 7 and relates to another modified embodiment.

In the modified embodiment illustrated in FIG. 11 the elastic strips 48 are joined together by a common washer 50 which extends to their end nearer the axis of the assembly, and it is through the said common washer 50 that they act on the friction washer 36 via the spacer washer 30, the recess 47 in the latter being in this case circularly continuous for this purpose.

Figure 7:
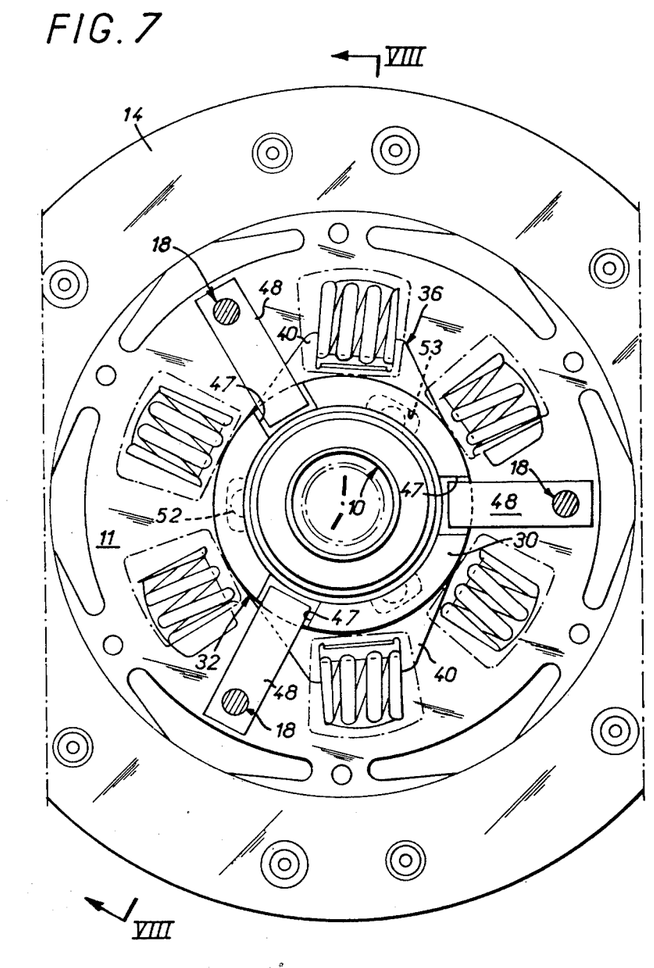
FIGS. 7, 8, 9 and 10 are views respectively similar to those in FIGS. 1, 2, 4 and 6 and relate to a modified embodiment, FIG. 7 being taken on the sectional line VII—VII in FIG. 8.
Figure 8:
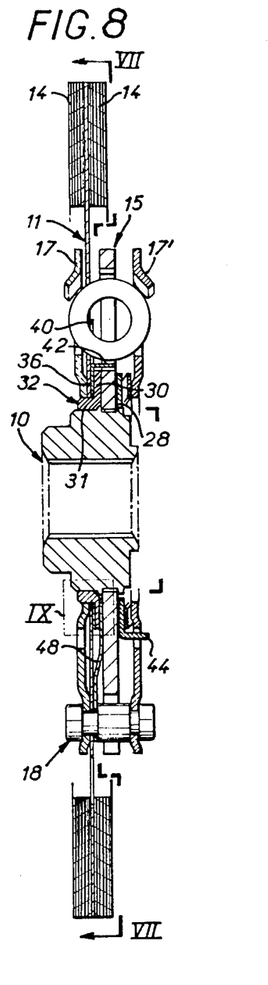
Figure 9:
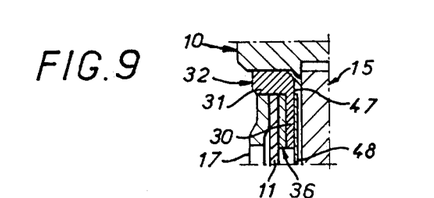

In the embodiments illustrated in FIGS. 7 to 11 the part 32 comprising the spacer washer 30 and the sleeve 31 is rotationally fastened to the guide washer 17, the sleeve 31 being provided for this purpose from place to place with bosses 52, as can be seen in dotted lines in FIGS. 7 and 11, over which bosses complementary cutouts in the guide washer 17 engage.

The friction washer 36 then itself has cutouts 53 by which it is engaged on the said bosses 52 on the sleeve 31 with, on each side of these bosses, sufficient circumferential clearance to enable it to be actually able to move angularly in relation to the assembly formed by the guide washer 17 and the friction disc 11 with which the part 32 is associated.

Figure 12:
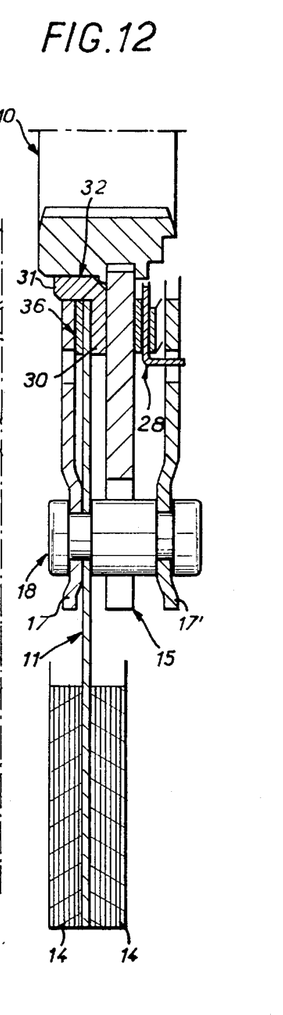
FIG. 12 is a similar view to that shown in FIG. 4 and relates to a modified embodiment.

The modified embodiment illustrated in FIG. 12 is similar to the embodiment described in connection with FIGS. 1 to 6, but, as for the embodiments described with reference to FIGS. 7 to 11, the part 32 consisting of the spacer washer and the sleeve 31 is disposed on the side where the guide washer 17 is located, while the friction washer 28 is disposed on the side where the guide washer 17' is located.

In the foregoing the friction washer 36 is equipped with axial lugs for cooperation with the hub disc 15.

Figures 13, 14:
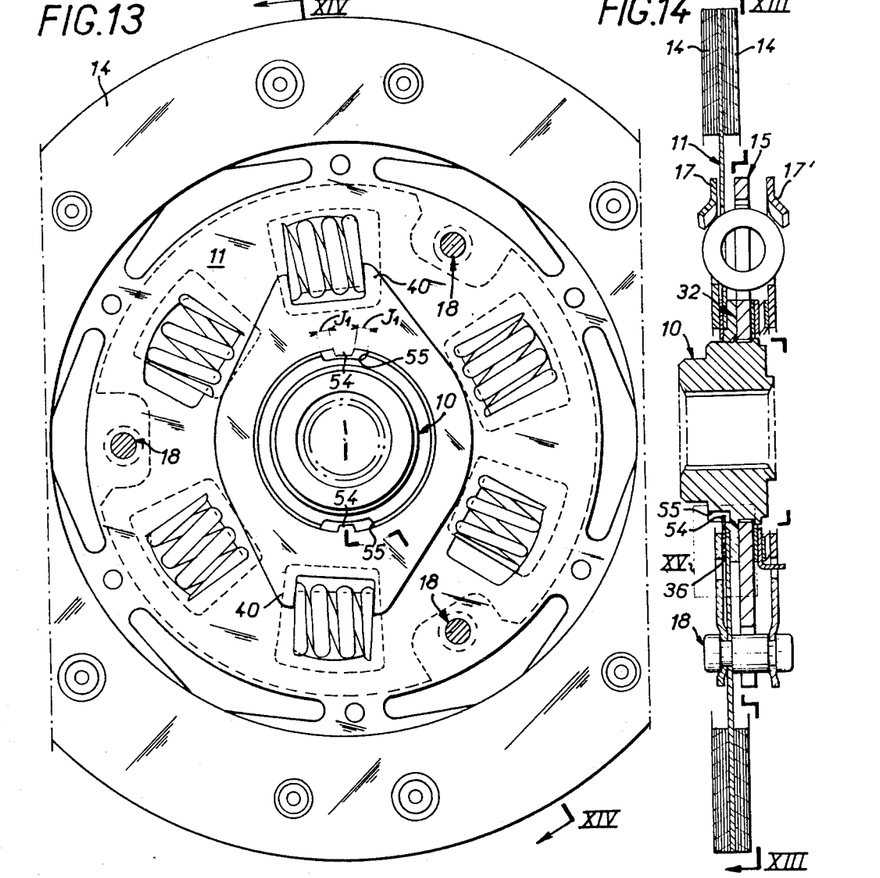
FIGS. 13 and 14 are respectively views similar to those in FIGS. 1 and 2 and relate to another modified embodiment, FIG. 13 being taken on the sectional line XIII—XIII in FIG. 14.
Figure 15:
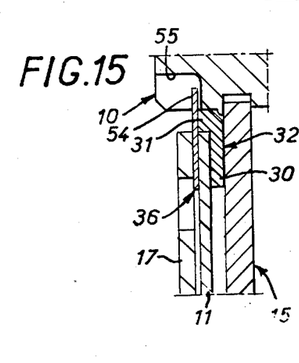
FIG. 15 shows to an enlarged scale a detail from FIG. 14, which is enclosed in a box XV in FIG. 14.

In the modified embodiments illustrated in FIGS. 13 to 15 the friction washer is adapted to cooperate directly with the hub 10 and for this purpose is provided on its inner periphery with studs 54 which extend radially in the direction of the axis of the assembly and which are engaged in grooves 55 in the hub 10 with clearance J1 provided circumferentially on each side, as previously.

In this case the friction washer 36 which, as is also the case in the modified embodiments illustrated in FIGS. 7 to 12, is a simple plate forming by itself a friction lining, provides the advantage of requiring only simple cutting out for its production.

Conjointly, in the embodiment illustrated in FIGS. 13 to 15 the sleeve 31 is reduced to a portion of sleeve limited at most to the axial thickness of the friction disc 11.

Figure 16:
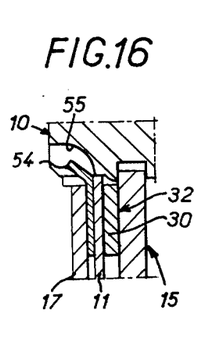
FIG. 16 is a similar view to that shown in FIG. 15 and relates to a modified embodiment.

In the modified embodiment illustrated in FIG. 16 the sleeve 31 is eliminated, the part 32 being reduced to the spacer washer 30. Also in this modified embodiment the grooves 55 in the hub 10 have a concave bottom and the studs 54 of the friction washer 36 are slightly curved correspondingly.

In the foregoing it was assumed that the transverse shoulder 19 on the posts 18, against which shoulder bear the elastic clamping means having an axial action which are associated with the friction washer 36, was the same shoulder as served at the same time for mounting the guide washer 17 and the friction disc 11 on these posts.

Figure 17:
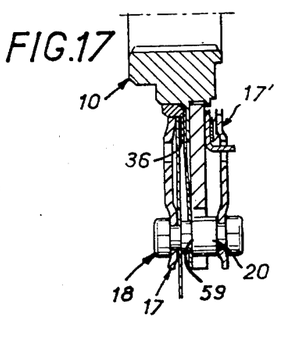
FIG. 17 is a partial view similar to that shown in FIG. 8 and relates to another modified embodiment.

In the modified embodiment illustrated in FIG. 17 a special transverse shoulder 59 is provided for the axially acting elastic clamping means, which in this case are elastic strips 48 of the kind described with reference to FIGS. 7 to 11, or preferably those described with reference to FIG. 11; for example, the strips may be cut out at their free end and thus be engaged by the corresponding cutouts on the posts 18.

The shoulder 59 on the posts 18 may for example be set back in relation to the central stem 20 of the posts 18, as illustrated.

As an alternative, it may consist of a flank of a groove provided for this purpose on the stem 20 in question.

In either case it is turned towards the guide washer 17 with which the friction washer 36 is associated.

In both cases it enables, as previously, a sub-assembly unit to be made in one piece, comprising the guide washer, the friction washer, the friction disc 11, and the axially acting elastic clamping means associated with the friction washer, optionally with the interposition of a spacer washer.

The present invention is not limited to the embodiments described and illustrated, but includes any alternative construction and/or combination of their various elements.

In particular, the friction washer 36 may be rotationally fastened to the hub 10 and thus apply its action over the entire movement of the two coaxial parts constituting the friction unit; for example, the clearance J1 provided on each side of the axis lugs 42, or of the radial studs 54, of the said washer 36 can be eliminated.

Moreover, similar arrangements to those made for the friction disc 36 may also be provided for the friction washer 28.

In addition, the field of application of the invention is not limited to the case where the disc 15 is fastened to the hub 10 while the guide washers 17, 17' carry the friction disc 11, that is to say to the case where the disc 15 is a hub disc in the strict sense; on the contrary, as an alternative and in a manner known per se, the disc 15 may be mounted for rotation relative to the hub 10 and may carry the friction disc 11, in which case the guide washers 17, 17' are fastened to the hub 10.

I claim:

1. A torsion damping device, particularly for a motor vehicle clutch, of the kind comprising two coaxial parts mounted for rotation relative to one another within the limits of a determined relative angular movement sector, a first of said coaxial parts including a disc and a second of said coaxial parts including two guide washers extending parallel to the said disc one on each side of said disc and connected to each other by small posts, elastic means interposed circumferentially between said coaxial parts, and friction means interposed axially between said coaxial parts, said friction means comprising at least one friction washer which is subjected to the action of elastic clamping means having an axial action and which, when in contact with one of said coaxial parts, is adapted to be fastened to the other of said coaxial parts for at least part of the sector of angular movement, and said elastic clamping means having an axial action thus associated with said friction washer bearing against a transverse shoulder turned towards one of said guide washers and urging said friction washer in the direction of said one guide washer and axialy away from said disc, said friction washer being between said elastic clamping means and said one guide washer.

2. A torsion device according to claim 1, further comprising a hub on which said disc is mounted, characterised in that said friction washer has at least one axial lug which is engaged in a groove in said hub.

3. A torsion damping device according to claim 2, wherein said axial lug is engaged with clearance in said groove in said hub.

4. A torsion device according to claim 1, characterised in that said shoulder being part of the small posts against which bear the axially acting elastic clamping means associated with said friction washer fasten said small posts to said one guide washer so that connection means conjointly connects both said guide washer and the said elastic means to said small posts.

5. A torsion damping device, particularly for a motor vehicle clutch, of the kind comprising two coaxial parts mounted for rotation relative to one another within the limits of a predetermined relative angular movement sector, a first of said coaxial parts comprising a disc and a second of said coaxial parts comprising two guide washers extending parallel to said disc one on each side thereof and connected to each other by small posts, elastic means interposed circumferentially between said coaxial parts, and friction means interposed axially between said coaxial parts, said friction means comprising at least one friction washer which is subjected to the action of elastic clamping means having an axial action and which, when in contact with one of the said coaxial parts, is adapted to be fastened to the other of said coaxial parts for at least part of the sector of angular movement, and said elastic clamping means having an axial action thus associated with said friction washer bearing against a transverse shoulder turned towards one of said guide washers and urging said friction washer in the direction of said one guide washer, said transverse shoulder being associated with said small posts, a spacer washer interposed between said one guide washer and said first coaxial part, characterised in that the said axially acting elastic clamping means includes means associated with the said friction washer acting on said friction washer through the medium of said spacer washer and bearing on a shoulder provided on said spacer washer for the purpose, said shoulder being set back from that face of said spacer washer turned towards said friction washers.

6. A torsion damping device according to claim 5, wherein said spacer washer forms a bearing.

7. A torsion damping device for a damping hub of a motor vehicle friction clutch, of the kind comprising two coaxial parts mounted for rotation relative to one another within the limits of a predetermined relative angular movement sector, a first of said coaxial parts comprising a disc and a second of said coaxial parts comprising two guide washers extending parallel to said disc one on each side thereof and connected to each other by small posts, elastic means interposed circumferentially between said coaxial parts, and friction means interposed axially between said coaxial parts, said friction means comprising at least one friction washer which is subjected to the action of elastic clamping means having an axial action and which, when in contact with one of the said coaxial parts, is adapted to be fastened to the other of said coaxial parts for at least part of the sector of angular movement, and said elastic clamping means having an axial action thus associated with said friction washer bearing against a transverse shoulder turned towards one of said guide washers, and urging said friction washer in the direction of said one guide washer, said transverse shoulder being associated with said small posts, said second coaxial part which comprises said two guide washers also carrying a friction disc, characterised in that said axially acting elastic clamping means associated with said friction washer comprises a central zone of said friction disc which is disposed between one of the said guide washers and said friction disc.

8. A torsion damping device, particularly for a motor vehicle clutch, of the kind comprising two coaxial parts mounted for rotation relative to one another within the limits of a predetermined relative angular movement sector, a first of said coaxial parts comprising a disc and a second of said coaxial parts comprising two guide washers extending parallel to said disc one on each side thereof and connected to each other by small posts, elastic means interposed circumferentially between said coaxial parts, and friction means interposed axially between said coaxial parts, said friction means comprising at least one friction washer which is subjected to the action of elastic clamping means having an axial action and which, when in contact with one of the said coaxial parts, is adapted to be fastened to the other, said coaxial part for at least part of the sector of angular movement, and said elastic clamping means having an axial action thus associated with said friction washer bearing against a transverse shoulder turned towards one said guide washers, and urging said friction washer in the direction of said one guide washer, said transverse shoulder being associated with said small posts, characterised in that said one guide washer, said axially acting elastic clamping means, said friction washer urged by the said elastic means in the direction of said one guide washer, said small posts including a shoulder thereof on which said axially acting elastic clamping means bear, and a friction disc together form a subassembly unit.

9. A torsion damping device according to claim 8, characterised in that said axially acting elastic clamping means comprise elastic strips which extend generally radially.

10. A torsion damping device according to claim 9, characterised in that said elastic strips act on said friction washer through spacer washer.

* * * * *